Aug. 27, 1929.  H. O. SCRANTON  1,726,043
HARVESTER FOR SUGAR CANES
Filed Aug. 26, 1926  6 Sheets-Sheet 2
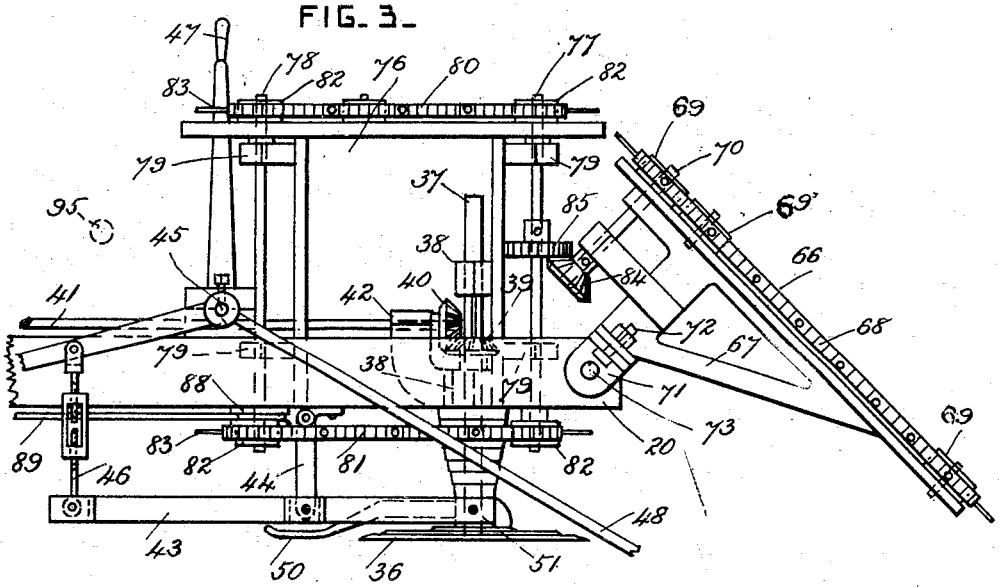
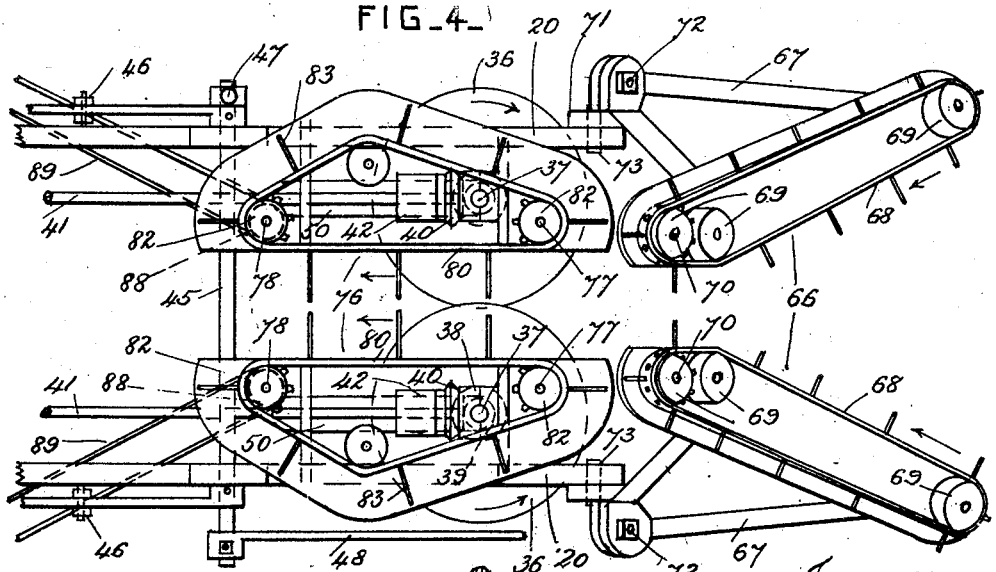
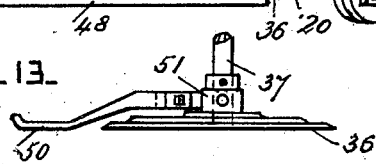

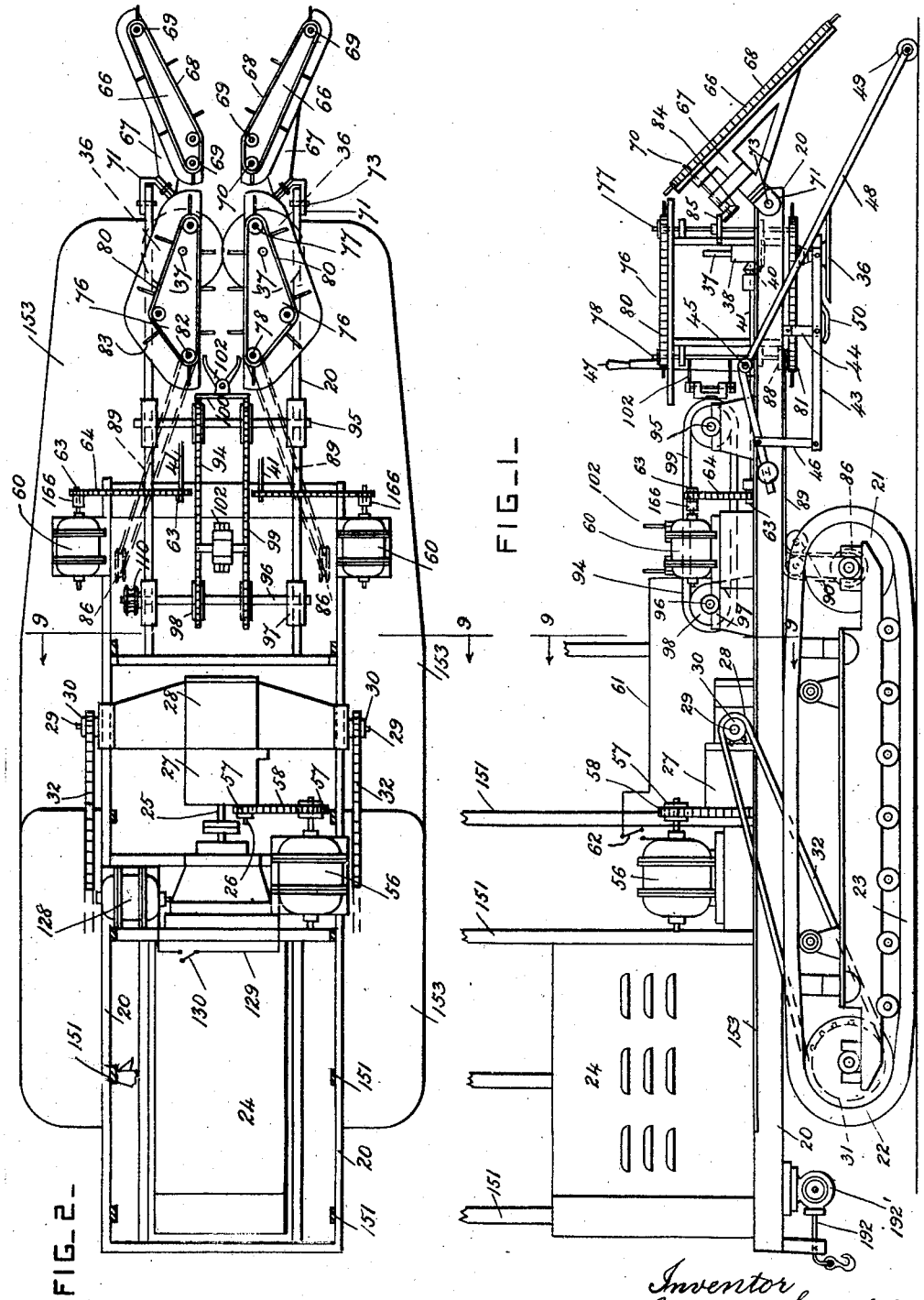

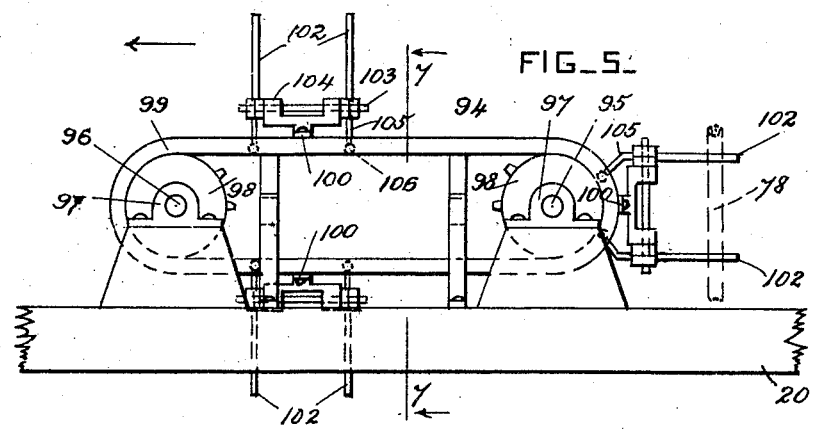

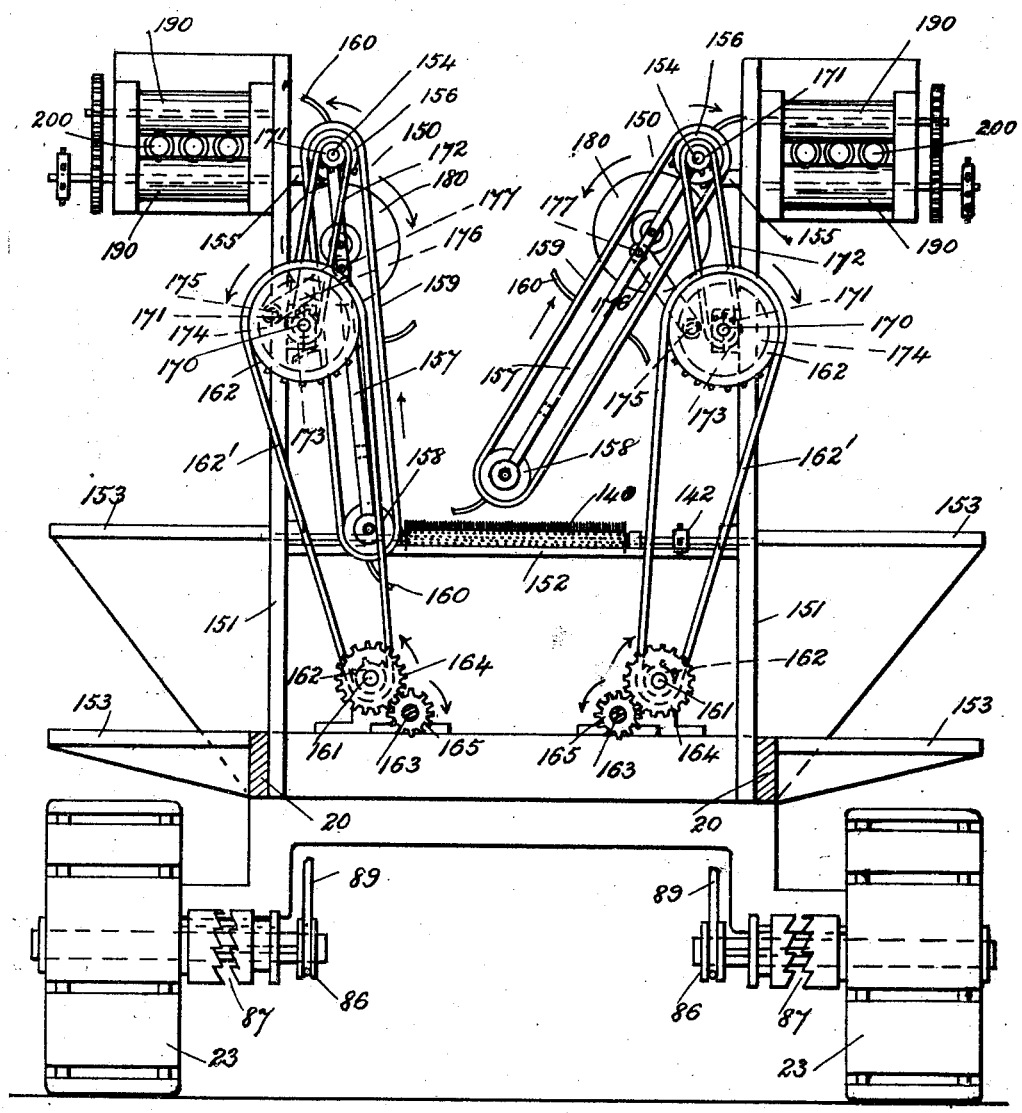

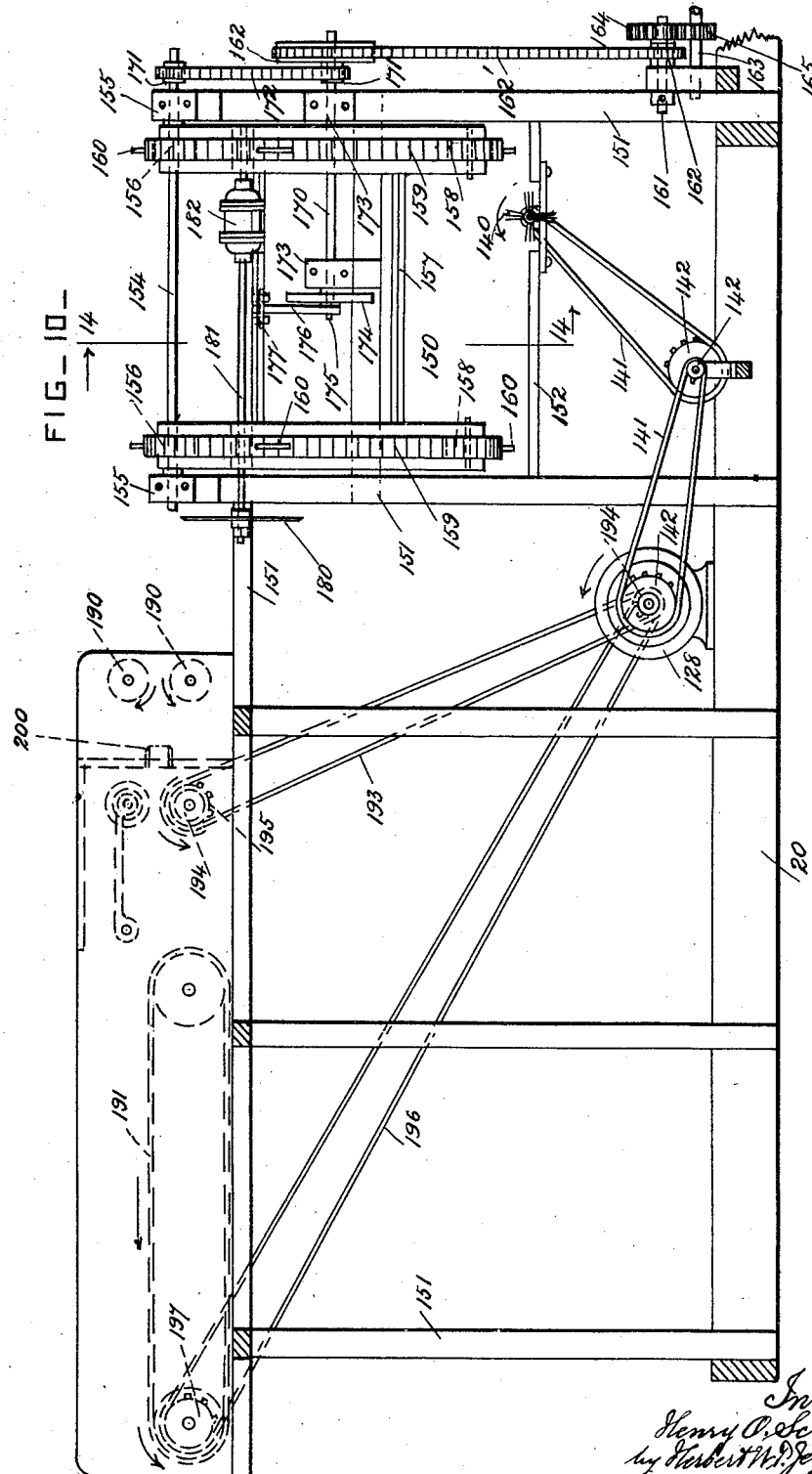

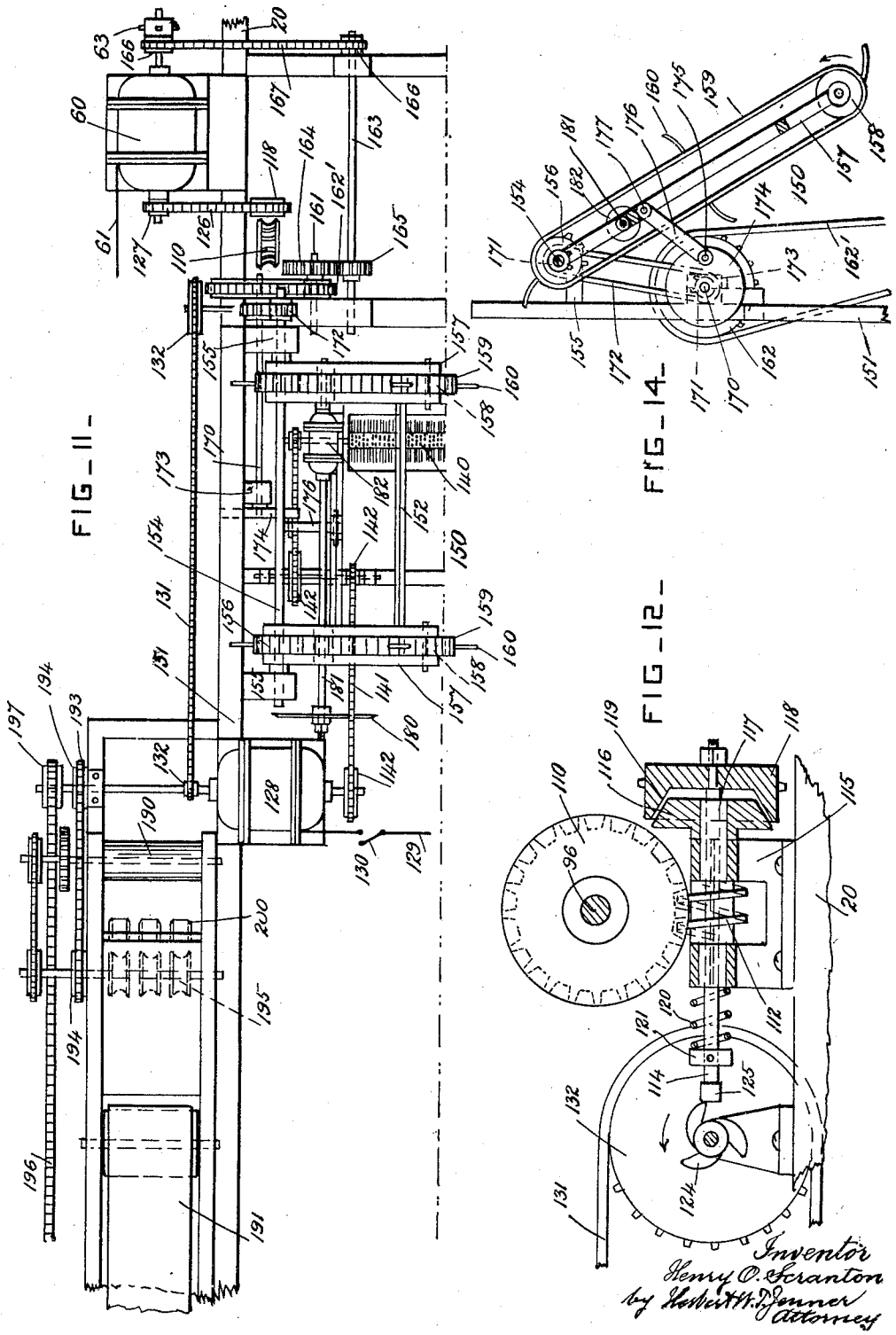

Patented Aug. 27, 1929.

1,726,043

UNITED STATES PATENT OFFICE.

HENRY OSBERT SCRANTON, OF LA FAYETTE, LOUISIANA.

HARVESTER FOR SUGAR CANES.

Application filed August 26, 1926. Serial No. 131,614.

This invention relates to harvesters specially adapted for sugar canes. According to this invention the machine is provided with a motor and self-propelling mechanism, and has also shears for cutting down the canes, cutting off the tops of the canes, and for stripping the leaves and other projections from the canes after topping them. All of these devices are mounted on the same wheeled frame or truck with the motor, and are actuated by it, the power being distributed to the various devices by mechanical driving mechanism and also by electricity. Combined with these various instrumentalities are also certain conveyers and elevators for conducting and guiding the canes through the machine, and for discharging them from it, and the machine is constructed so as to harvest the canes with as little manual labor as possible.

The invention consists in the construction and co-ordination of the various parts of the machine as hereinafter fully described and claimed.

In the drawings, Figure 1 is a side view of the entire machine in the form of a diagram, many parts being omitted for clearness. Fig. 2 is a plan view of the machine shown in Fig. 1, and is also a diagram. Fig. 3 is a side view of the cutting and conveying devices at the front end of the machine, and is drawn to a larger scale. Fig. 4 is a plan view of the devices shown in Fig. 3. Fig. 5 is a side view of the transfer conveyer provided with jaws for the canes. Fig. 6 is a plan view of the transfer conveyer. Fig. 7 is a cross-section through the transfer conveyer, taken on the line 7—7 in Fig. 5. Fig. 8 is a plan view of a portion of the track which operates the jaws shown in Fig. 5. Fig. 9 is a cross-section through the machine, taken on the lines 9—9 in Figs. 1 and 2, and is drawn to a larger scale than said figures. Fig. 10 is a front view of one of the elevators for the canes shown in Fig. 9, looking from the center line of the machine. Fig. 11 is a plan view of the elevator shown in Fig. 10. Fig. 12 is a detail front view, partially in section, of the worm gearing for driving the transfer conveyer. Fig. 13 is a detail side view of one of the arms which keep the cutters off the ground. Fig. 14 is a cross-section through the elevator, taken on the line 14—14 in Fig. 10, and showing the oscillating devices.

The machine is provided with a suitable main frame 20 which is mounted on front and rear ground wheels 21 and 22, and the ground wheels at each side of the machine are preferably provided with an endless caterpillar chain or device 23 of approved construction to enable the machine to be propelled over rough places and wet ground.

A motor 24 is secured over the rear end portion of the frame 20, and is preferably an internal combustion engine of approved construction. This motor has a motor shaft 25 which is operatively connected with a main driving shaft 26 by means of any suitable transmission gearing inclosed in a casing 27, and adapted to reduce the speed to a predetermined extent. A differential gearing device of approved construction is also provided, and is driven by the motor shaft 25, and is inclosed in a casing 28.

The motor, transmission gearing, and differential gear are not more fully described and shown as they are of any approved construction used on tractors. The differential gear drives two shafts 29 arranged axially in line with each other in the usual way, and journaled in the casing 28. These two shafts 29 are provided with sprocket wheels 30 which drive sprocket wheels 31, secured to the rear ground wheels 22 of the caterpillar traction device, by means of drive chains 32. The transmission gearing is provided with suitable starting and stopping devices for driving the tractor forwardly or rearwardly, and for permitting it to stand stationary. These devices are similar to those used on tractors and motor cars, and do not form parts of the present invention.

The canes are cut down by a pair of horizontal cutter blades 36 arranged at the front end portion of the machine, and secured on vertical cutter shafts 37 journaled in bearings 38 supported from the frame 20. These cutter shafts are slidable vertically in the bearings 38, and have bevel gears 39 splined to them, and meshing into bevel gears 40 secured on longitudinal driving shafts 41 journaled in bearings 42 also supported by the frame 20. The means for raising and lowering the cutters are similar in most respects to those described and shown in the Patent No. 1,491,069, issued to me on April 22, 1924. Levers 43 are supported from the frame 20 by pivoted links 44 between their ends. One end of each lever 43 is operatively connected with a shaft 37, and its other end with a rock-shaft 45 by links 46. The rock-shaft extends across the machine, and has any suitable operating lever or handle 47 secured on it, so that the cutter blades are raised and lowered together.

The rock-shaft has also an arm 48 adjustably secured on it, and projecting forwardly of the cutters, and provided at its free end with a pilot roller 49 which runs on the ground, and lifts the cutter blades automatically when it runs up a rise in or over a projection on the ground. Each vertical shaft 37 has also an arm 50 adjustably secured to the block 51 to which the lever 43 is pivoted. This arm 50 projects to the rear of the cutter blade, and bears on the ground behind it, and is provided as a stop to limit the downward movement of the cutter blade. The free end of the arm is adjustable vertically. The canes grow out of ridges in the ground, and the tractor runs in channels between the ridges and straddles them.

A dynamo or electric generator 56 is secured to the frame 20, and is driven from the main driving shaft 26 by means of sprocket wheels 57 and a drive chain 58, or in any other approved way. This dynamo is large enough to provide all the electricity required to run the machine, and it and the motor 24 are run continuously while the machine is at work. The dynamo may also be driven from the motor shaft 25 if desired, instead of from the shaft 26.

Two similar electric motors 60 are provided, and are secured to the frame 20, and are operatively connected with the dynamo 56 by any suitable wires 61 provided with an electric switch 62 so that both motors 60 can be stopped without stopping the dynamo. The electric motors drive the longitudinal driving shafts 41 by means of sprocket wheels 63 and drive chains 64, or other suitable driving devices.

The rotary cutters can be driven at any desired speed, and independently of the forward speed of travel of the machine as a whole, and the speed of its conveyers. Some of the canes grow vertically and are straight, but many of them are bent, and others grow at various angles with the vertical. In order to straighten up the canes, and to collect them into small shocks or bundles, a pair of diverging collecting conveyers 66 is provided at the front of the frame 20. These conveyers are inclined downwardly and forwardly at an angle of about 45 degrees. Each conveyer has a separate frame 67, and has an endless chain 68 provided with projecting teeth for engaging the canes. Each chain 68 passes over guide sheaves 69 journaled in its frame 67, and one of these sheaves is secured on a driving shaft 70. Each frame 67 is adjustably secured to a bracket 71 by a clamping bolt 72 arranged in suitable holes or slots so that the angle formed between the two conveyers 66 can be varied in amplitude by suitably moving the frames and brackets. Each bracket 71 is pivoted to the frame 21 by a horizontal pin 73. The horizontal pins 73 are arranged substantially in line with each other, and the axes of the pivot bolts 72 are arranged crosswise of the pins 73 and at an angle to the vertical. The axes of the end wheels 69 of each conveyer are arranged parallel to each other so that the stretches of each conveyer work in an inclined plane having no curvature. The intermediate guide wheel is arranged so that the adjacent portions of the upper parts of the stretches of the two conveyers are kept substantially parallel to each other.

A pair of conveyers 76 is also provided having teeth, and is arranged to the rear of the collecting conveyers 66, on the center line of draft of the machine. The conveyers 76 are arranged parallel to each other. Each conveyer 76 has a front vertical shaft 77, and a rear vertical shaft 78, journaled in bearings 79 supported by the frame 20. Each vertical shaft has an upper conveyer chain 80 and a lower conveyer chain 81, which pass over sprocket wheels 82 secured on the respective shafts, and each chain has teeth 83 for engaging the canes as they leave the diverging collecting conveyers 66.

The driving shaft 70 of each collecting conveyer 66 has a friction wheel 84 secured on it, which bears on a friction disk 85 secured on the front shaft 77 of the conveyer 76 which is adjacent to the shaft 70. The weight of the collecting conveyer holds its friction wheel 84 in driving engagement with the friction disk 85. The free ends of the conveyers 66 are free to rise vertically when they strike a projection on the ground. Any other approved driving mechanism may however be used for driving the collecting conveyers, so that they will collect and straighten up the canes, and deliver them to the pair of conveyers 76. The rear vertical shaft of each conveyer 76 is driven from the front ground wheel 21 of the caterpillar traction device on the same side of the machine with it.

A grooved drive sheave 86 is connected to the ground wheel 21 by any suitable clutch 87, and drives a similar grooved sheave 88 secured on the shaft 78, by means of an endless flexible connection 89 which passes around the sheaves 86 and 88, and over guide sheaves 90 journaled in the frame. The clutch preferably disengages the sheaves automatically when the harvester is propelled rearwardly. The pairs of conveyers 76 and 66 are in this manner driven at a predetermined ratio of speed with respect to the speed of travel of the machine as a whole. When the machine is propelled faster, and moves forward more quickly, the speed of the conveyers is correspondingly increased, which is essential to the successful operation of the machine.

The canes are cut down by the revolving cutter blades, and when cut are held upright between the pair of conveyers 76, and are delivered by them to the transfer conveyer 94 provided with jaws.

As the conveyers 66 are moved rearwardly at substantially the same speed as the machine is propelled forwardly, there is no drag upon the roots of the canes. It is not necessary for the teeth of the conveyers 76 and 66 to always work opposite to each other, and if one conveyer of either pair slips a little, on account of its friction driving devices, it does not affect its action materially. The pair of conveyers 76 hold the canes upright during the cutting operation, and also move them rearwardly and continue to hold them upright, when actuated from the front end of the caterpillar traction mechanism. The application of power to the rear end of the said traction mechanism by the motor drives the lower stretches of the traction chains, which bear on the ground, in tension. This method of driving holds the lower stretches in better driving contact with the ground, while the machine is propelled forwardly to cut the canes, than is possible when the power is applied to the front end of the traction mechanism and the lower stretches of its chains are not driven in tension.

The transfer conveyer 94 is arranged on the center line of draft of the machine, above the level of the lower chains 81, and below the level of the upper chains 80 of the pair of conveyers 76. The transfer conveyer is provided with a front shaft 95 and a rear shaft 96, each arranged horizontally, and journaled in bearings 97 supported by the frame 20. Sprocket wheels 98 are secured on these shafts, and are provided with a pair of endless conveyer chains 99 spaced apart, and connected at suitable points of their length by means of crossbars 100.

Jaws 102 for gripping the canes are provided, and are supported by the crossbars 100, and three sets of gripping jaws are preferably provided, and are spaced at equal distances apart. Each set of jaws comprises two pairs of jaws 102 spaced apart, and pivoted by pins 103 in brackets 104 secured to one of the crossbars, the said pins 103 being arranged longitudinally of the machine. The jaws 102 have crossed shanks 105 at their ends which project on the other side of the pins from the jaws, and these shanks 105 have rollers 106 journaled on them. The rollers 106 run between track bars 107 which are supported from the frame 20. These track bars are parallel to each other, and have inclined portions 108 at predetermined parts of their length.

The rollers 106 bear on these inclined portions, and the jaws are opened and closed by them at predetermined places. The inclined portions 108 are so arranged that the jaws open as shown in Fig. 6 before being moved upwardly from below at the front end of the transfer conveyer. Arrived at this point they are closed by the inclined portions of the bars, so that they grip the shocks of canes which are delivered to them by the pair of conveyers 76. The jaws tilt the canes over to a horizontal position as the transfer conveyer is operated, and carry them to the rear end of the conveyer, and discharge them to the elevators. The jaws are opened by the inclined portions of the track before the jaws commence to move downwardly, and they remain open until they are required to grip another shock of canes at the front end of the transfer conveyer.

The canes do not drop down after being cut off, as they are seized by the jaws of the transfer conveyer before they have time to do so, on account of the conveyers being in comparatively rapid motion, but any support for the lower ends of the canes can be provided if desirable.

The transfer conveyer is operated intermittently, and for that purpose a worm wheel 110 is secured on one end portion of its rear shaft 96. A worm 112 is splined on a shaft 114 journaled in a bracket 115 supported by the frame 20, and gears into the worm wheel 110. A friction clutch member 116 is secured to the worm by a sleeve 117. A driving wheel 118 is secured on one end portion of the shaft 114, and is provided with a friction clutch member 119 for engaging with the clutch member 116.

The two clutch members are pressed into engagement with each other by means of a spring 120 arranged between the bracket 115 and a collar 121 on the shaft. The clutch members are disengaged periodically by means of a star wheel or cam wheel 124 which bears on a head 125 on the other end of the shaft from the clutch member 119. The driving wheel 118 of the transfer conveyer is revolved by means of a drive chain 126 which passes over it and over a sprocket wheel 127 driven by one of the electric motors 60 supported by the frame 20. The motor 128 is operated from the dynamo 56 through a conducting wire 129 which is provided with a suitable switch 130 for starting or stopping the electric motor. The transfer conveyer is operated intermittently at suitable intervals, in order that a bunch of canes may be delivered to each elevator when its lower portion is projecting to receive them. The cam wheel 124 is revolved by the motor 128 by means of a drive chain 131 and sprocket wheels 132, but any other approved means may be used for driving the cam wheel and the worm, and both can be driven by one of the electric motors 60 if desired, or from the electric motor 128. A revolving brush or feeding device 140 is arranged to the rear of the transfer conveyor, and is journaled in suitable bearings supported by the frame. The object of this brush is to shoot the canes rapidly to the rear as soon as they have been discharged by the jaws. This brush is revolved by a drive chain 141 and sprocket wheels 142 from the electric motor 128 and intermediate driving devices, but it may be driven through the feed mechanism of the stripping devices, hereinafter described, if preferred. The brush or feeding device is revolved so that the canes are moved rearwardly by it at a greater speed than when they are on the transfer conveyor.

Two similar elevators 150 for the canes are provided, and are arranged facing each other to the rear of the transfer conveyer 94, and one on each side of the center line of draft of the machine. Each elevator has a vertical frame 151 secured to the main frame 20, and a suitable platform or support 152 for the canes is provided between the two elevators, to prevent them from dropping. The machine has also platforms 153 for the men who operate it to stand on, which are secured to the frame 20 in any suitable positions. Each elevator 150 has a driving shaft 154 at its top which is journaled in bearings 155 secured to the vertical frame 151. Each elevator has sprocket wheels 156 secured on its driving shaft 154, and a swinging frame 157 is pivoted concentric with the driving shaft, and has guide wheels 158 journaled at its lower and free end portion. Endless elevator chains or bands 159 pass over the wheels 158 and 156, and have curved teeth 160 secured to them for raising the canes.

Each elevator is operated from a driving shaft 170 which is revolved by a countershaft 161. This countershaft is journaled in bearings on the frame 20, and the shaft 170 is revolved by means of sprocket wheels 162 secured on the shafts 161 and 170, and a drive chain 162′ which passes over the said sprocket wheels.

The driving shaft 170 is operatively connected with the driving shaft 154 of the elevator by sprocket wheels 171, and a drive chain 172 which passes around them.

The countershaft 161 is driven from a shaft 163, also journaled in bearings on the frame 20, by means of toothed wheels 164 and 165 secured on them and meshing into each other. The shaft 163 is revolved by the electric motor 60 on the same side of the machine with it, and which also drives the revolving cutter blades. Sprocket wheels 166 are secured on the motor shaft and on the shaft 163, and are operatively connected by means of an endless drive chain 167.

The toothed wheels and countershaft 161 afford a means for changing the direction of motion, and for adjusting the speed, and are arranged so that the canes, discharged by the jaws of the transfer conveyer, are raised to a sufficient height in the machine to be fed to the stripping devices.

The driving shaft 170 is journaled in bearings 173 on the upright frame 151. The elevator is oscillated by means of a crank-plate 174 secured on the shaft 170, and provided with a crank-pin 175. A connecting-rod 176 connects the crank-pin with a pin 177 which projects from the swinging frame 157. The two elevators are oscillated alternately, so that each has its lower end portion moved in turn transversely across the center line of draft of the machine, and is enabled to pick up some of the canes.

The canes are supported by the curved teeth of the elevator, and their tops project at the rear end of the elevator. These tops are cut off during the upward passage of the canes by means of a revolving cutter blade 180 secured on a shaft 181. This shaft 181 is journaled in the swinging frame 157, and swings back and forth with it. An electric motor 182 is also secured to the swinging frame 157, and drives the shaft 181 and the cutter 180. The blade is revolved in the direction of the arrow in Fig. 9, and it cuts off the tops of the canes as they are raised against its edge by the elevator. The cut tops drop to the ground beneath. The electric motors 182 are driven by the dynamo 56 through wires.

When the canes arrive at the tops of the elevators they are seized by men who insert their topped ends between the feed rolls 190 of the stripping mechanism 200. The stripping mechanism is of any approved construction that will remove the leaves and other projections from the canes, such as shown in Patent No. 1,491,070, issued to me on April 22, 1924. After passing through the stripping devices the canes are received on a discharge conveyer of approved construction, and are discharged into a trailer truck at the rear end of the machine.

A winding mechanism 192 is provided on the frame 20 at the rear of the machine for drawing up the trailer truck from a distance, and is of any approved construction, and may be driven by an electric motor 192′.

The stripping mechanism and the discharge conveyer are preferably operated by the electric motor 128, hereinbefore described, by means of any suitable driving devices. The electric motor 128 is secured to the rear part of the frame 20 in any convenient position, and is shown connected to the main rolls 195 of the stripping mechanism by a drive chain 193 and sprocket wheels 194, and is shown connected to the discharge conveyer 191 by a drive chain 196 and sprocket wheels 197.

The various driving devices can be arranged in different ways so as to drive the various devices at suitable speeds. The shears are preferably driven at a speed suitable for the maximum speed of travel of the machine. The use of electric motors for driving certain parts of the machine enables the machine to be built of lighter weight, and with much less complication of mechanism and gearing.

What I claim is:

1. In a cane harvester, a supporting frame, vertical cutter shafts journaled in the frame and provided with cutters which form a pair of shears, a rock-shaft journaled crosswise of the frame, means for raising and lowering the shears operated by the said rock-shaft, and an arm for raising the shears automatically secured to the rock-shaft and projecting forwardly of the shears and provided with a pilot roller which runs on the ground.

2. In a cane harvester, a supporting frame, vertical cutter shafts journaled in the frame and provided with cutters which form a pair of shears, levers for raising the cutters provided with blocks which are operatively connected with the said shafts, and arms secured to the said blocks and projecting rearwardly of the cutters and operating to limit their downward movement by contact with the ground.

3. In a cane harvester, a wheeled frame, self-propelling mechanism for the frame, cutting devices for cutting down the canes arranged at the front end of the frame, conveying devices which engage the canes during the cutting operation, stripping mechanism for the canes arranged at the rear part of the frame, elevator mechanism arranged on the frame in advance of the stripping mechanism and operating to raise the canes to it, a transfer conveyer for the canes arranged intermediate of the said conveying devices and the said elevator mechanism, and means for topping the canes while being carried up by the said elevator mechanism.

4. A cane harvester as set forth in claim 3, the said stripping mechanism comprising separate stripping devices arranged at each side of the machine, and the said elevator mechanism comprising two separate elevators receiving the canes alternately from the transfer conveyer and each provided with a separate means for topping the canes.

5. A cane harvester as set forth in claim 3, the said transfer conveyer being provided with means for operating it intermittently at predetermined intervals of time.

6. In a cane harvester, a supporting frame, cutting devices for cutting down the canes arranged at the front end of the frame, conveying devices which engage the canes during the cutting operation, and a transfer conveyer receiving the canes from the conveying devices and comprising an endless conveyer member, jaws for gripping the canes arranged in pairs and pivoted to the said member, means for opening and closing the jaws at predetermined intervals, and driving devices for operating the transfer conveyer intermittently.

7. In a cane harvester, a combination of parts as set forth in claim 6, the said jaws being provided with crossed shanks, and the said means for opening and closing the jaws comprising parallel track bars having inclined portions for moving the shanks laterally.

8. In a cane harvester, a combination of parts as set forth in claim 6, the said driving devices comprising a driving shaft operatively connected with the transfer conveyer, a driving wheel, a clutch operatively connecting the said shaft and wheel, and means for disengaging the members of the clutch automatically at predetermined intervals of time.

9. In a cane harvester, a combination of parts as set forth in claim 6, the said driving devices comprising a worm wheel which actuates the transfer conveyer, a longitudinally movable shaft provided with a driving wheel having a clutch member, a worm splined on the said shaft and engaging with the said worm wheel, a clutch member revolving with the worm, a spring for moving the shaft longitudinally to place the clutch members in driving engagement, and a rotary cam wheel operating to move the shaft longitudinally in the reverse direction at periodic intervals.

10. In a cane harvester, a combination of parts as set forth in claim 6, the said devices comprising a worm wheel operatively connected with the conveyer, a worm meshing into the worm wheel, a driving shaft for revolving the worm, a driving wheel, a clutch operatively connecting the said shaft and wheel, and means for disengaging the members of the clutch automatically at predetermined intervals of time.

11. In a cane harvester, a supporting frame, cutting devices for cutting down the canes arranged at the front end of the frame, conveying devices which engage the canes during the cutting operation, a transfer conveyer receiving the canes from the conveying devices and discharging them horizontally, said transfer conveyer being provided with means for operating it intermittently, and elevator mechanism arranged on the frame and receiving the horizontal canes from the transfer conveyer and operating to raise the canes and to discharge them laterally of the frame.

12. In a cane harvester, a combination of parts as set forth in claim 11, and having also a rotary feeding device for the canes arranged intermediate of the transfer conveyer and the elevator mechanism and driven continuously at a higher speed than the transfer conveyer.

13. In a cane harvester, a combination of parts as set forth in claim 11, and having also means for topping the canes supported by the said elevator mechanism and arranged to cut the canes while being raised by the said elevator mechanism.

14. In a cane harvester, a combination of parts as set forth in claim 11, the said elevator mechanism comprising an upright frame secured to the said supporting frame, a swinging elevator frame pivoted at its upper part to the upright frame, endless elevator members carried by the swinging frame and provided with means for operating them, and means for oscillating the said swinging frame and the elevator members crosswise of the transfer conveyor.

15. In a cane harvester, a combination of parts as set forth in claim 11, the said elevator mechanism comprising an upright frame secured to the said supporting frame, a swinging elevator frame pivoted at its upper part to the upright frame, endless elevator members carried by the swinging frame and provided with means for operating them, means for oscillating the said swinging frame and the elevator members crosswise of the transfer conveyer, and a rotary cutting blade journaled in the said swinging frame and operating to top the canes while supported by the elevator members.

16. In a cane harvester, a combination of parts as set forth in claim 11, the said elevator mechanism comprising two upright frames secured one at each side of the supporting frame, and two similar endless elevators supported by the upright frames respectively and provided with driving devices which move their adjacent stretches upwardly.

17. In a cane harvester, a combination of parts as set forth in claim 11, the said elevator mechanism comprising two upright frames secured one at each side of the supporting frame, swinging elevator frames pivoted at their upper ends to the upright frames, endless elevator members carried by the swinging frames and provided with driving devices which move their adjacent stretches upwardly, and means for operating the swinging frames and elevator members alternately and crosswise of the transfer conveyer.

18. In a cane harvester, a main frame, a caterpillar traction device supporting the main frame, a motor carried by the main frame and operatively connected with the rear driving wheels of the caterpillar traction device, the lower stretches of the traction chains being driven in tension when the harvester is propelled forwardly to cut the canes, means for cutting down the canes arranged at the front end of the main frame, a pair of conveyers supported by the main frame and operating to hold the canes upright during the cutting operation and to move the cut canes rearwardly, and intermediate driving devices operatively connecting the front driving wheels of the said caterpillar traction device with the rear end portions of the said pair of conveyers.

19. In a cane harvester, a combination of parts as set forth in claim 18, the said intermediate driving devices being provided with clutches which automatically disengage the conveyers from the caterpillar traction device when the cane harvester is propelled rearwardly.

20. In a cane harvester, a main frame, means for cutting down the canes mounted at the front end of the main frame, a pair of tilting conveyers for straightening up and collecting the uncut canes, each conveyer comprising a frame provided with wheels at its ends and an endless conveyer chain passing around the said wheels, the said conveyer frame being pivoted to the main frame by a horizontal pivot which permits the front end of the conveyer to tilt upwardly when it strikes an obstacle, and means for limiting the downward movements of the front ends of the said conveyers.

21. In a cane harvester, a combination of parts as set forth in claim 20, each said conveyer being pivoted to the main frame between the ends of the conveyer chain, and being also provided at its rear end with driving mechanism which is disengaged automatically when the front end of the conveyer is tilted upwardly.

22. In a cane harvester, a main frame, means for cutting down the canes mounted at the front end of the main frame, and a pair of adjustable conveyers for straightening up and collecting the uncut canes, each conveyer being connected to the main frame and comprising a frame provided with wheels at its ends and an endless conveyer chain passing around the said wheels, the said conveyer frame having an adjusting portion pivotally connected to its main portion so as to permit the angle between the adjacent stretches of the pair of chains to be varied.

23. In a cane harvester, a combination of parts as set forth in claim 22, the said adjusting portion being connected to the main frame by a horizontal pivot to permit the front end of the conveyer to rise on striking an obstacle.

24. In a cane harvester, a main frame, means for cutting down the canes mounted at the front end of the main frame, a pair of downwardly and forwardly inclined conveyers for straightening up and collecting the uncut canes connected to the main frame and arranged beyond its front end, and a pair of horizontal conveyers for holding the canes upright during the cutting operation, said horizontal conveyers being supported by the main frame and provided with upper and lower horizontal conveyer chains, the upper horizontal chains being arranged above the level of the upper and rear ends of the inclined conveyers, and the lower horizontal chains being arranged on a level with the front and lower end portions of the inclined conveyers.

25. In a cane harvester, a main frame, means for cutting down the canes mounted at the front end of the main frame, a pair of horizontal conveyers for holding the canes upright during the cutting operation, separate devices for stripping the canes arranged one at each side of the rear part of the machine above the level of the said pair of conveyers, and conveying and elevating mechanism arranged between the said pair of conveyers and the stripping devices and operating to tilt the cut and upright canes to a horizontal position and to move them rearwardly and elevate them while horizontal to the level of the said stripping devices.

In testimony whereof I have affixed my signature.

HENRY OSBERT SCRANTON.